(12) United States Patent
Hachiya et al.

(10) Patent No.: US 8,937,590 B2
(45) Date of Patent: Jan. 20, 2015

(54) INFORMATION PROCESSING APPARATUS AND POINTING CONTROL METHOD

(75) Inventors: Koji Hachiya, Akishima (JP); Hiroshi Terada, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 346 days.

(21) Appl. No.: 12/976,401

(22) Filed: Dec. 22, 2010

(65) Prior Publication Data

US 2011/0157014 A1 Jun. 30, 2011

(30) Foreign Application Priority Data

Dec. 25, 2009 (JP) .................................. 2009-295628

(51) Int. Cl.
| | | |
|---|---|---|
| G06F 3/033 | (2013.01) | |
| G06F 3/0488 | (2013.01) | |
| G06F 3/0354 | (2013.01) | |
| G06F 3/0486 | (2013.01) | |
| G06F 9/44 | (2006.01) | |

(52) U.S. Cl.
CPC .......... *G06F 3/0488* (2013.01); *G06F 3/03547* (2013.01); *G06F 3/0486* (2013.01); *G06F 9/4445* (2013.01)
USPC ............. 345/157; 345/1.1; 345/173; 715/856

(58) Field of Classification Search
USPC ........ 345/156, 157, 173–175, 1.1; 178/18.01, 178/18.03; 715/856, 740; 709/217, 203, 709/224, 230
See application file for complete search history.

(56) References Cited

U.S. PATENT DOCUMENTS

| | | | | |
|---|---|---|---|---|
| 5,250,929 A | * | 10/1993 | Hoffman et al. ............... | 715/823 |
| 5,757,361 A | * | 5/1998 | Hirshik .......................... | 345/156 |
| 5,818,425 A | * | 10/1998 | Want et al. .................... | 345/158 |
| 5,841,435 A | * | 11/1998 | Dauerer et al. ............... | 715/775 |
| 5,923,307 A | * | 7/1999 | Hogle, IV .......................... | 345/4 |

(Continued)

FOREIGN PATENT DOCUMENTS

| | | |
|---|---|---|
| JP | 08-272515 A | 10/1996 |
| JP | 09-244780 A | 9/1997 |

(Continued)

OTHER PUBLICATIONS

First Office Action mailed by Japan Patent Office on Feb. 22, 2011 in the corresponding to Japanese patent application No. 2009-295628.

(Continued)

*Primary Examiner* — Koosha Sharifi-Tafreshi
(74) *Attorney, Agent, or Firm* — Knobbe, Martens, Olson & Bear LLP

(57) ABSTRACT

According to one embodiment, an information processing apparatus comprises a touch screen display, a display controller, a copy screen image display module and a pointing module. The display controller is configured to control the touch screen display and an external display. The copy screen image display module is configured to display on a screen of the touch screen display a copy screen image which is obtained by copying a screen image which is displayed on a screen of the external display. The pointing module is configured to designate a position on the screen image of the external display, the position corresponding to a touch position on the copy screen image, based on a relative position of the touch position in relation to the copy screen image.

7 Claims, 8 Drawing Sheets

(56) References Cited

U.S. PATENT DOCUMENTS

| | | | |
|---|---|---|---|
| 6,670,950 B1* | 12/2003 | Chin et al. | 345/173 |
| 6,765,557 B1* | 7/2004 | Segal et al. | 345/173 |
| 6,917,348 B2* | 7/2005 | Demsky et al. | 345/1.1 |
| 2002/0191029 A1* | 12/2002 | Gillespie et al. | 345/810 |
| 2003/0025678 A1* | 2/2003 | Lee et al. | 345/173 |
| 2003/0132948 A1* | 7/2003 | Bhogal et al. | 345/660 |
| 2003/0179243 A1* | 9/2003 | Numano | 345/782 |
| 2003/0222856 A1* | 12/2003 | Fedorak et al. | 345/173 |
| 2004/0239621 A1* | 12/2004 | Numano | 345/156 |
| 2005/0015731 A1* | 1/2005 | Mak et al. | 715/779 |
| 2006/0031779 A1* | 2/2006 | Theurer et al. | 715/781 |
| 2006/0034042 A1* | 2/2006 | Hisano et al. | 361/681 |
| 2006/0119588 A1* | 6/2006 | Yoon et al. | 345/173 |
| 2006/0253797 A1* | 11/2006 | Madan et al. | 715/792 |
| 2009/0228801 A1* | 9/2009 | Lee et al. | 715/730 |
| 2009/0231493 A1* | 9/2009 | Baalbergen et al. | 348/734 |
| 2010/0137026 A1* | 6/2010 | Kim et al. | 455/556.1 |
| 2010/0138780 A1* | 6/2010 | Marano et al. | 715/804 |
| 2010/0293504 A1* | 11/2010 | Hachiya | 715/806 |

FOREIGN PATENT DOCUMENTS

| | | |
|---|---|---|
| JP | 2000-066649 A | 3/2000 |
| JP | 2003-280630 A | 10/2003 |
| JP | 2006-053678 A | 2/2006 |
| JP | 2009-003941 A | 1/2009 |
| JP | 2009-140471 A | 6/2009 |
| JP | 2009-289205 A | 12/2009 |

OTHER PUBLICATIONS

First Office Action mailed by Japan Patent Office on Oct. 30, 2012 in the corresponding to Japanese patent application No. 2011-129500.

* cited by examiner

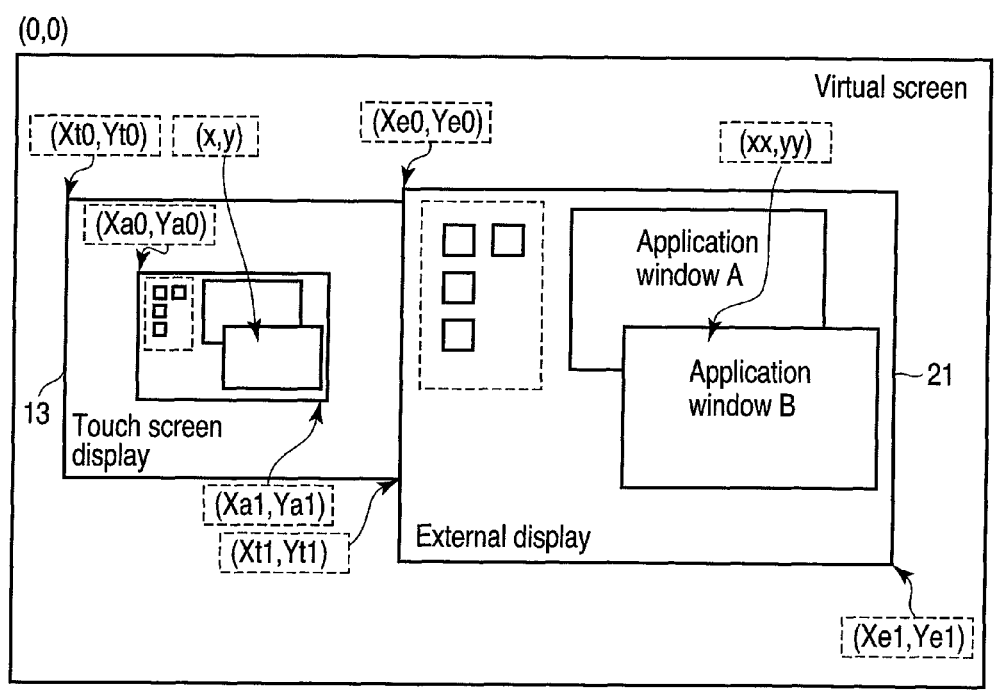
F I G. 10

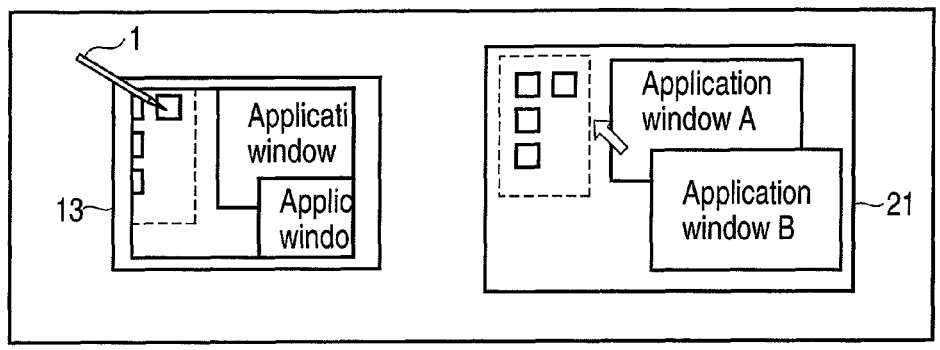
F I G. 1 4
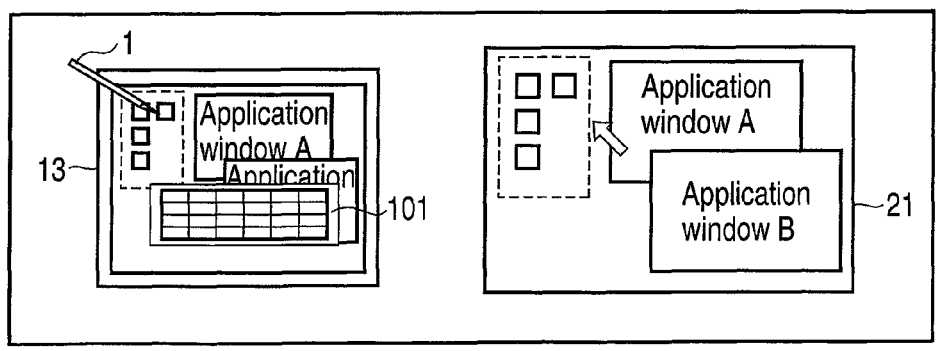
F I G. 1 5

INFORMATION PROCESSING APPARATUS AND POINTING CONTROL METHOD

CROSS-REFERENCE TO RELATED APPLICATIONS

This application is based upon and claims the benefit of priority from Japanese Patent Application No. 2009-295628, filed Dec. 25, 2009; the entire contents of which are incorporated herein by reference.

FIELD

Embodiments described herein relate generally to an information processing apparatus, such as a personal computer, which includes a touch panel display, and a pointing control method which is applied to the information processing apparatus.

BACKGROUND

In recent years, various types of portable personal computers, such as notebook personal computers, have been developed. Most of the portable personal computers have a multi-display function. The multi-display function is a function of displaying screen images on, for example, two displays, respectively.

In a system supporting the multi-display function, for example, two regions are allocated to a virtual screen, and screen images corresponding to the two regions are displayed on two displays, respectively. In addition, in the multi-display function, a so-called "clone display" mode, in which the same screen image is displayed on two displays, is prepared.

In usual cases, however, in the "clone display" mode, the upper limit of the resolution of a displayable screen image is restricted to the resolution of that one of the displays, which has the lower resolution. For example, when the "clone display" mode is used in an environment using two displays such as a low-resolution internal display provided in a portable personal computer and a high-resolution external display, only a screen image having a low resolution that is equal to the resolution of the internal display can be displayed on the external display. Thus, the actual capability of the high-resolution external display cannot effectively be utilized.

In addition, recently, computers including touch panel displays have been developed. In the computer including the touch panel display, various events for controlling an application window or the like, which is displayed on the touch panel display, can be generated in accordance with a user's touch operation on the touch panel display.

A pointing device, such as a mouse or a touch pad, functions as a relative pointing device, with which a pointing position (cursor position) on the screen is moved in accordance with the movement of the pointing device. On the other hand, the touch panel display functions as an absolute pointing device, and a touch position itself on the touch panel display corresponds to a pointing position on the screen.

Jpn. Pat. Appln. KOKAI Publication No. 2009-140471 discloses a digital video camera including a touch-panel-type display. This digital video camera has a function of causing the touch-panel-type display to function as a touch pad when an external monitor is connected to the digital video camera.

In the technique of KOKAI Publication No. 2009-140471, however, the touch-panel-type display is merely used as a substitute device for a touch pad. It is thus difficult for the user to understand the relationship between a coordinate position on the touch panel and a coordinate position on the external monitor. In order to understand the relationship between a coordinate position on the touch panel and a coordinate position on the external monitor, the user is required to frequently move the view point between the touch panel and the external monitor.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 10 is an exemplary view illustrating an example of a coordinate conversion operation which is executed by the information processing apparatus of the embodiment;

FIG. 14 is an exemplary view illustrating an example in which a part of a screen image of the external display is displayed, in enlarged scale, as a copy screen image on the touch screen display;

FIG. 15 is an exemplary view illustrating an example in which a virtual keyboard is further displayed on the copy screen image of the touch screen display.

DETAILED DESCRIPTION

Various embodiments will be described hereinafter with reference to the accompanying drawings.

In general, according to one embodiment, an information processing apparatus comprises a touch screen display, a display controller, a copy screen image display module and a pointing module. The display controller is configured to control the touch screen display and an external display. The copy screen image display module is configured to display on a screen of the touch screen display a copy screen image which is obtained by copying a screen image which is displayed on a screen of the external display. The pointing module is configured to designate a position on the screen image of the external display, the position corresponding to a touch position on the copy screen image, based on a relative position of the touch position in relation to the copy screen image.

Figure 1:
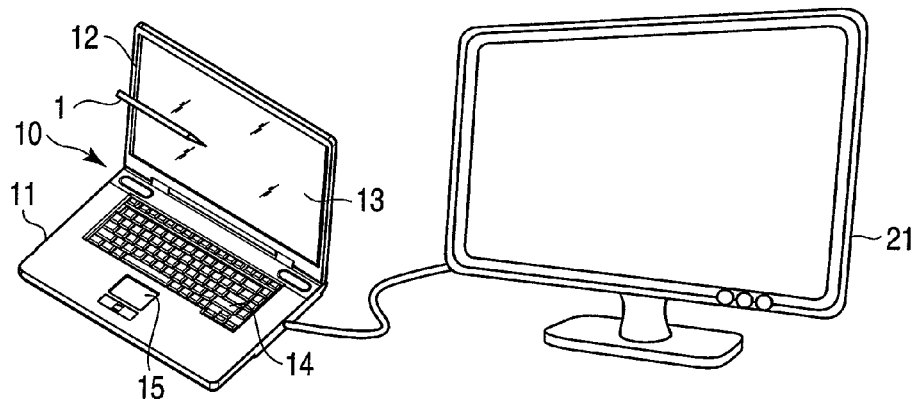
FIG. 1 is an exemplary perspective view illustrating the external appearance of an information processing apparatus according to an embodiment.

FIG. 1 illustrates the external appearance of an information processing apparatus according to an embodiment. The information processing apparatus is realized, for example, as a battery-powerable portable personal computer 10.

FIG. 1 is a perspective view of the computer 10 in the state in which a display unit of the computer 10 is opened. The computer 10 comprises a computer main body 11 and a display unit 12. A liquid crystal display (LCD) 13, which functions as a touch screen display, is built in the display unit 12. The display screen of the LCD 13 is disposed on an approximately central part of the display unit 12. The LCD 13 functions as an internal monitor of the computer 10. A transparent touch panel is disposed on the upper surface of the LCD 13, and a touch screen display is realized by the LCD 13 and the transparent touch panel. The touch screen display can detect a touch position on the display screen, which has been touched by a pen or a finger. The user can select various objects (e.g. icons representing folders and files, menus, buttons, etc.), which are displayed on the display screen of the LCD 13, by using a fingertip or a pen 1. Coordinate information indicative of the touch position on the display screen is input from the touch screen display to the CPU in the computer 10.

The display unit 12 has a thin box-shaped housing. The display unit 12 is rotatably attached to the computer main body 11 via a hinge portion. To be more specific, the display unit 12 is attached to the computer main body 11 so as to be rotatable between an open position where the top surface of the computer main body 11 is exposed and a closed position where the top surface of the computer main body 11 is covered with the display unit 12.

The computer main body 11 is a base unit having a thin box-shaped housing. A keyboard 14, a touch pad 15, etc. are disposed on the top surface of the computer main body 11. An external display connection terminal, to which an external display 21 can be connected, is provided on the computer main body 11. The external display connection terminal may be composed of, for example, an RGB connector, a DVI connector, or an HDMI connector.

An operating system, which is executed on the computer 10, has a multi-display function. Specifically, the operating system manages a virtual screen including a first region and a second region. A first screen image corresponding to the first region on the virtual screen is displayed on the screen of the LCD 13 which is used, for example, as a primary monitor. In addition, a second screen image corresponding to the second region on the virtual screen is displayed on the screen of the external display 21 which is used, for example, as a secondary monitor. As the external display 21, use may be made of a display having a resolution that is higher than the resolution of the screen of the LCD 13. In this case, the resolution (size) of the first region on the virtual screen can be set to be equal to the resolution of the screen of the LCD 13, and the resolution (size) of the second region on the virtual screen can be set to be equal to the resolution of the screen of the external display.

Figure 2:
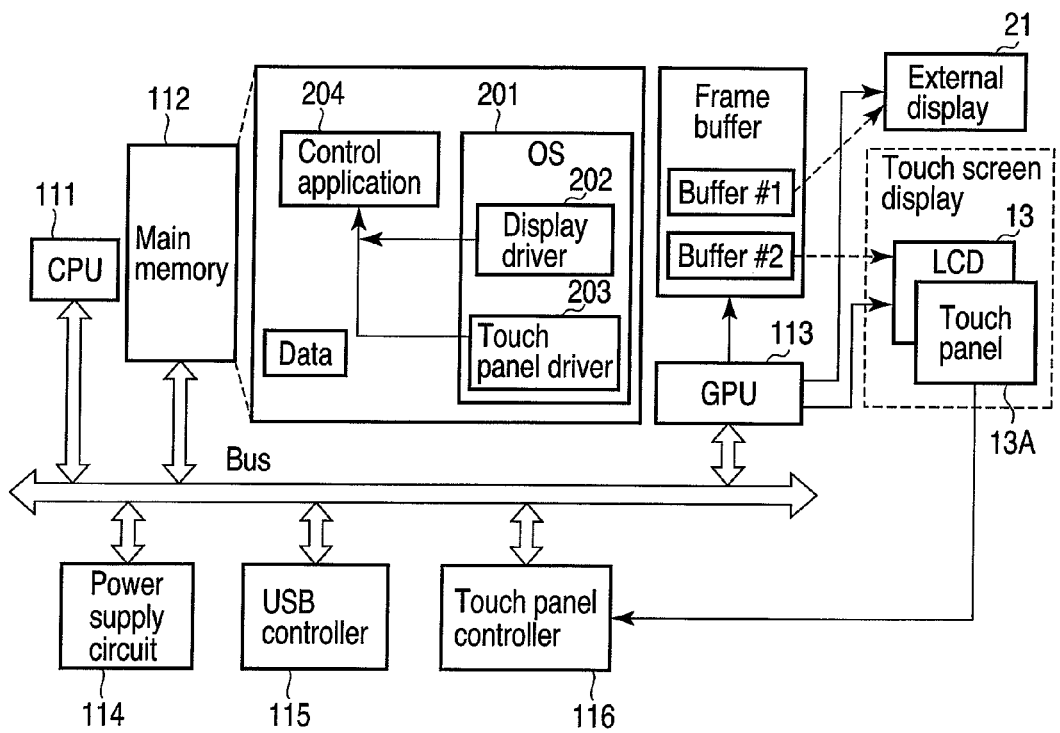
FIG. 2 is an exemplary block diagram illustrating a system structure example of the information processing apparatus of the embodiment.

Next, referring to FIG. 2, the system configuration of the computer 10 is described.

The computer 10 includes a CPU 111, a main memory 112, a graphics processing unit (GPU) 113, a power supply circuit 114, a USB controller 115, and a touch panel controller 116.

The CPU 111 is a processor which is provided in order to control the operation of the computer 10. The CPU 111 executes an operating system (OS) 201 and various application programs, which are loaded in the main memory 112. The application programs include a control application program 204 for controlling a screen image on the external display 21 by using a touch panel display.

The control application program 204 is software for enabling the user to manipulate a graphical user interface, such as an application window, a menu or a button, which is displayed on the screen of the external display 21, simply by performing a touch operation on the touch panel display (LCD 13) while viewing the screen of the touch panel display (LCD 13). The control application program 204 can communicate with each of a display driver program 202 and a touch panel driver program 203, which are provided in the OS 201. The control application program 204 can receive, from the display driver program 202, a connection event indicative of the connection of the external display 21 to the computer 10 or a disconnection event indicative of the disconnection of the external display 21 from the computer 10. In addition, the control application program 204 can receive coordinate information indicative of a touch position on the touch panel display from the touch panel driver program 203.

In order to display on the touch panel display a screen image which is identical or similar to a screen image displayed on the screen of the external display 21, the control application program 204 displays on the touch panel display, or the LCD 13, a copy screen image which is obtained by copying the screen image displayed on the screen of the external display 21. In this case, the size (resolution) of the copy screen image may be reduced in accordance with the resolution of the LCD 13. For example, an image comprising one layer is used as the copy screen image. Even in the case where a plurality of application windows are displayed on the screen of the external display 21, the entire screen image including the plural application windows is copied, and a single screen image obtained by the copy is displayed on the screen of the LCD 13 as the above-described copy screen image.

In this manner, unlike the conventional "clone display" mode, the image comprising one layer, which is obtained by copying the screen image of the external display 21, is displayed on the screen of the LCD 13. Thereby, while the actual resolution of the external display 21 is effectively being used, the screen image identical or similar to the screen image displayed on the screen of the external display 21 can also be displayed on the touch panel display.

Further, the control application program 204 has a function (pointing function) for designating a position on the screen image of the external display 21, which corresponds to a touch position on the copy screen image, based on a relative position of the touch position on the copy screen image in relation to the copy screen image. By this pointing function, simply by performing an operation of touching a position corresponding to a graphical user interface on the copy screen image, such as an application window, a menu or a button, the user can manipulate a corresponding graphical user interface on the screen image of the external display.

The GPU 113 is a display controller which controls the LCD (internal monitor) 13 and the external display (external monitor) 21. Based on an image rendering request which is received from the CPU 111 via a bus, the GPU 113 executes a display process (graphics arithmetic process) for rendering display data on a frame buffer (video memory). A buffer #1, which is an image rendering area for the external monitor, and a buffer #2, which is an image rendering area for the internal monitor, are prepared in the frame buffer. The buffer #1 is used for rendering a screen image corresponding to a region on a virtual screen that is managed by the OS 201, and the buffer #2 is used for rendering a screen image corresponding to another region on the virtual screen. The GPU 113 generates a video signal for displaying a screen image on the external display 21, based on display data which is rendered on the buffer #1, and generates a video signal for displaying another screen image on the LCD 13, based on display data which is rendered on the buffer #2.

The power supply circuit 114 is a circuit which supplies power to the respective components of the computer 10. The USB controller 115 controls a USB device which is connected to the computer 10. The touch panel controller 116 controls a transparent touch panel 13A which is laid over the screen of the LCD 13. The touch panel 13A is configured to detect a touch position on the touch panel 13A (touch screen display), which is touched by the user's finger or the pen 1, for example, by using a resistive touch screen method or a capacitive touch screen method. Besides, as the touch panel 13A, use may be made of a multi-touch panel which can detect a plurality of touch positions at the same time.

Figure 3:
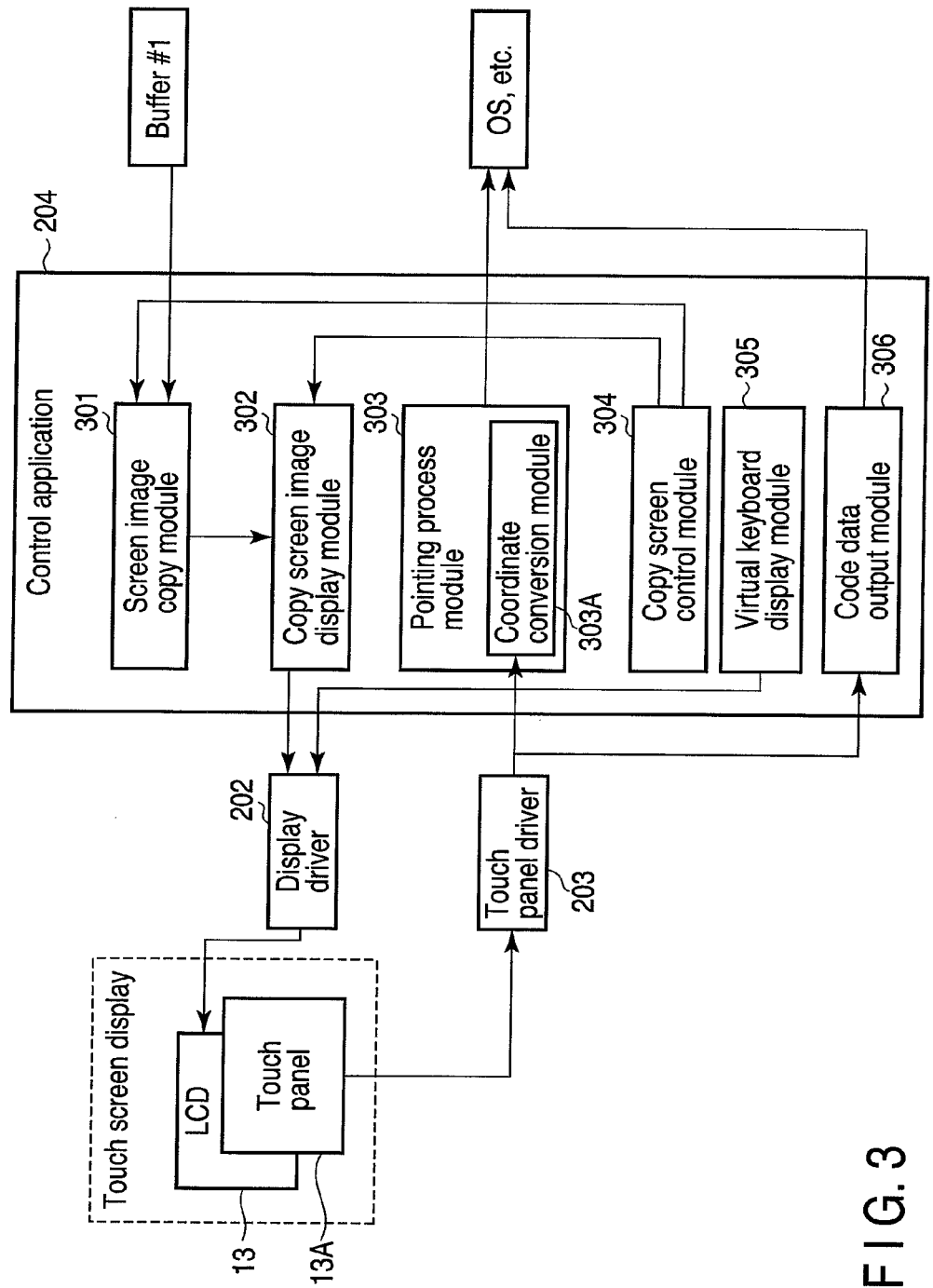
FIG. 3 is an exemplary block diagram illustrating a structure example of a control application program which is executed by the information processing apparatus of the embodiment.

Next, referring to FIG. 3, the structure of the control application program 204 is described.

The control application program 204 includes a screen image copy module 301, a copy screen image display module 302, a pointing process module 303, a copy screen control module 304, a virtual keyboard display module 305, and a code data output module 306.

The screen image copy module 301 copies a screen image which is displayed on the screen of the external display 21, for example, by copying the display data stored in the buffer #1. The copy screen image display module 302 executes a resize process, such as reduction in size, on the screen image which has been copied by the screen image copy module 301, thereby generating a copy screen image having a size (resolution) matching with the resolution of the screen of the LCD 13. Further, the copy screen image display module 302 displays the generated copy screen image on the screen of the LCD 13, for example, via the display driver program 202. In this case, for example, a display region (window) corresponding to the control application program 204 may be opened on a part of the screen of the LCD 13, or may be opened in a manner to cover the entire screen of the LCD 13, and the copy screen image may be displayed on the window. The display data corresponding to the generated copy screen image is rendered on the buffer #2.

The pointing process module 303 receives coordinate information indicative of a touch position on the screen of the LCD 13, from the touch panel driver program 203. For example, when a certain position on the copy screen image is touched by the user's finger or pen 1, the pointing process module 303 receives, from the touch panel driver program 203, coordinate information indicative of the touch position on the copy screen image. Responding to the reception of the coordinate information, the pointing process module 303 calculates the position on the screen image on the external display 21, which corresponds to the touch position on the copy screen image, and executes a process for designating (pointing) the calculated position.

Specifically, the pointing process module 303 includes a coordinate conversion module 303A which converts the coordinates of the touch position on the copy screen image on the LCD 13 to the coordinates of the position on the screen image of the external display 21, which corresponds to this touch position. Using the coordinate conversion module 303A, the pointing process module 303 specifies the position on the screen image of the external display 21, which corresponds to the touch position on the copy screen image.

The copy screen control module 304 executes, for example, a process of informing the screen image copy module 301 of a copy region in the screen image of the external display 21. The copy region can be designated by, for example, the user's operation on the touch pad 15. Needless to say, it is not necessary that the copy region be explicitly designated. Unless the copy region is explicitly designated, the entire screen image of the external display 21 is used as the copy region. In addition, the copy screen control module 304 informs the copy screen image display module 302 of a parameter such as a reduction ratio for reducing the screen image of the external display 21.

The virtual keyboard display module 305 displays a virtual keyboard on the screen of the LCD 13, for example, on the copy screen image. The virtual keyboard includes a plurality of virtual keys for inputting a plurality of key codes. The code data output module 306 selects a virtual key, which is present at the touch position on the screen of the LCD 13, from among the plural virtual keys included in the virtual keyboard. The selection of the virtual key can be executed, for example, based on the coordinate information of the touch position and key allocation information. The key allocation information indicates regions on the screen of the LCD 13, where the plural virtual keys are displayed respectively, that is, display regions of the virtual keys.

The code data output module 306 outputs code data corresponding to the selected virtual key to the OS 201, an active application program, etc. For example, in the case where an application window which is opened on the external display 21 is an active window, the user types the virtual keyboard on the screen of the LCD 13, thus being able to input code data, such as character codes, to the application window opened on the external display 21.

Next, referring to FIG. 4 to FIG. 9, a description is given of an external display control process which is executed by the embodiment.

Figure 4:
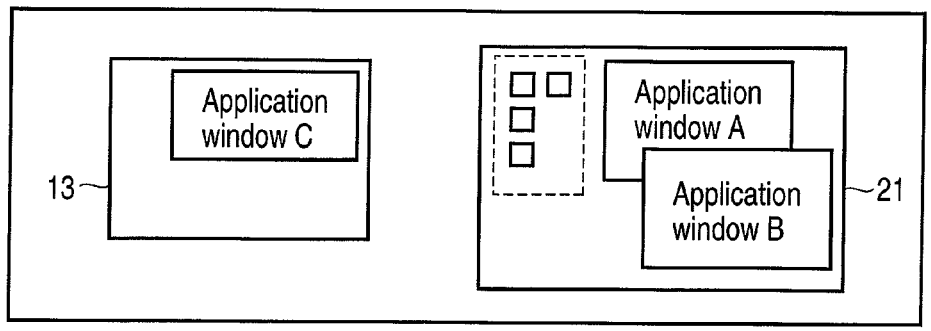
FIG. 4 is an exemplary view illustrating examples of screen images which are displayed on a touch screen display and an external display by the information processing apparatus of the embodiment.

FIG. 4 illustrates a state in which screen images are displayed, respectively, on the LCD 13 and the external display 21 by the multi-display function of the OS 201. A first screen image and a second screen image, which correspond to a first region and a second region on a virtual screen that is managed by the OS 201, are displayed on the LCD 13 and external display 21, respectively.

Figure 5:
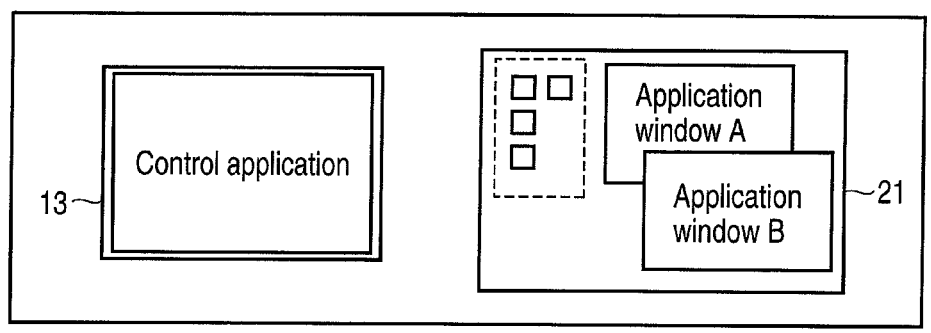
FIG. 5 is an exemplary view illustrating examples of screen images which are displayed on the touch screen display and the external display when the control application program illustrated in FIG. 3 is started.
Figure 6:
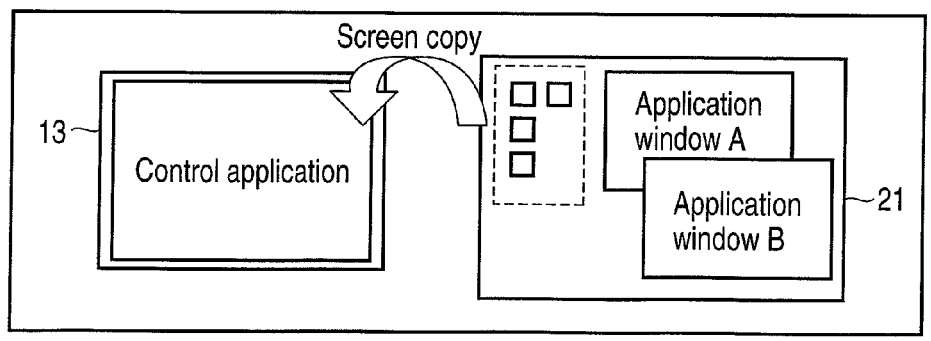
FIG. 6 is an exemplary view illustrating a state in which the screen image on the external display is copied by the control application program of FIG. 3.
Figure 7:
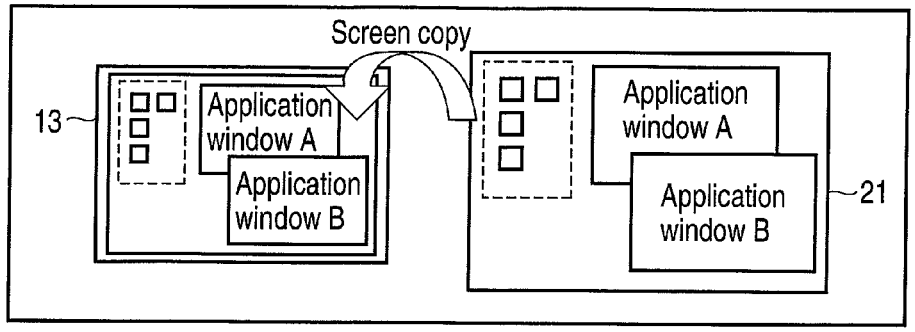
FIG. 7 is an exemplary view illustrating a state in which the screen image on the external display, which has been copied by the control application program of FIG. 3, is displayed on the touch screen display.

If the control application program 204 is executed, a display region corresponding to the control application program 204 is displayed on the screen of the LCD 13, as shown in FIG. 5. As shown in FIG. 6, the control application program 204 copies the screen image (second screen image) displayed on the external display 21. In the case where application windows A and B and a plurality of icons are displayed on the desktop screen of the external display 21, as shown in FIG. 6, the entire image of the desktop screen, in which the application windows A and B and the plural icons are arranged, is copied. As shown in FIG. 7, the control application program 204 displays the copied screen image on the screen of the LCD 13, that is, on the display region corresponding to the control application program 204. In this case, the copy screen image, which is displayed on the screen of the LCD 13, has an aspect ratio which is equal to the aspect ratio of the desktop screen of the external display 21. The user can confirm the same screen image as the screen image of the desktop screen of the external display 21, by viewing the LCD 13.

Figure 8:
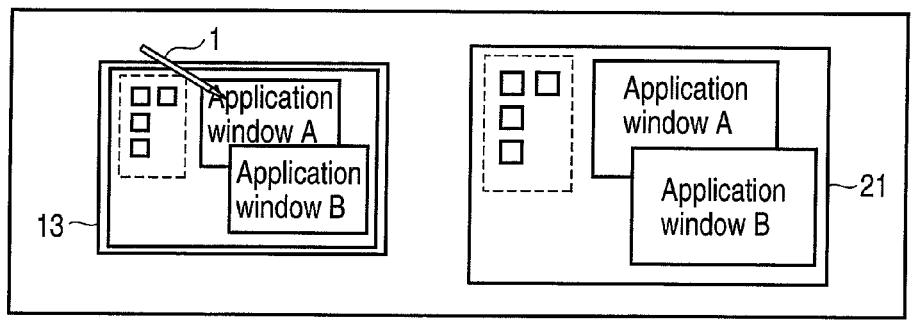
FIG. 8 is an exemplary view illustrating a state in which the touch screen display of FIG. 7 is touched.
Figure 9:
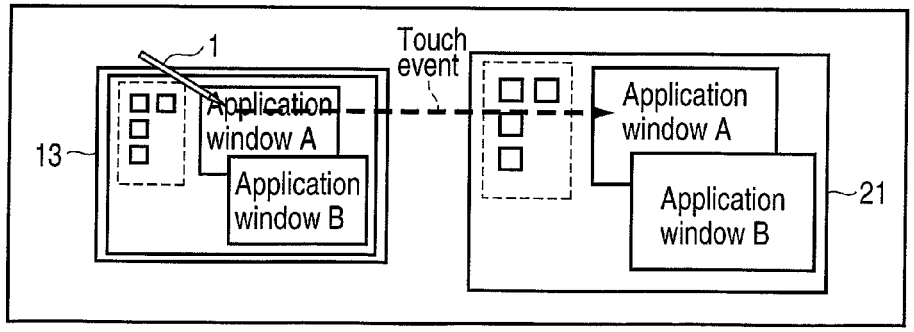
FIG. 9 is an exemplary view illustrating a state in which an event for controlling the screen image of the external display is issued, based on the touch position on the touch screen display.

If the user touches the copy screen image of the LCD 13 by the pen 1 or finger, as shown in FIG. 8, the control application program 204 calculates the position on the screen image of the external display 21, which corresponds to the touch position, on the basis of the relative position of the touch position in relation to the copy screen image, and issues a touch event (also referred to as "pointing event") including coordinate information indicative of the calculated position. Thereby, as shown in FIG. 9, the position on the screen image of the external display 21, which corresponds to the touch position on the copy screen image, is designated ("pointing"). Thus, the user can manipulate the actual GUI which is displayed on the external display 21, for example, by simply touching a GUI, such as a button or a menu item, which is presented on the copy screen image.

As has been described above, since the touch screen display is an absolute pointing device, the touch position itself corresponds to the pointing position on the screen. In the embodiment, the copy screen image, which is obtained by copying the screen image displayed on the external display 21, is displayed on the touch screen display (LCD 13) as a kind of operational screen. Thus, the user can confirm, for example, the position of the GUI on the screen image on the external display 21, by viewing the LCD 13 of the computer 10 that is located at hand. In addition, responding to the touch operation on the copy screen image, the touch event (pointing event) designating the position on the screen image on the external display 21, which corresponds to the touch position, is automatically issued. Thus, the user can easily control the application window, etc., displayed on the screen image on the external display 21.

Next, referring to FIG. 10, a description is given of an example of the process of calculating a position on the screen image on the external display 21, which corresponds to a touch position on the copy screen image.

FIG. 10 shows examples of the positions of the first and second screen images on the virtual screen. The case is assumed in which (1) the coordinates of the upper left end and lower right end of the first screen image displayed on the LCD 13 are (Xt0, Yt0) and (Xt1, Yt1), (2) the coordinates of the upper left end and lower right end of the copy screen image displayed on the first screen image (the display region of the control application program 204) are (Xa0, Ya0) and (Xa1, Ya1), (3) the coordinates of the upper left end and lower right end of the second screen image displayed on the external display 21 are (Xe0, Ye0) and (Xe1, Ye1), (4) and the coordinates of the position on the copy screen image, which is touched by the user's finger or the pen, are (x, y).

To begin with, the control application program 204 calculates the relative position of the touch position (x, y) in relation to the copy screen image, that is, the ratio of the coordinates (x, y) to the size of the copy screen image:

$$xr=(x-Xa0)/(Xa1-Xa0)$$

$$yr=(y-Ya0)/(Ya1-Ya0).$$

In the above equations, xr indicates the ratio of the X coordinate position of the touch position (x, y) to the size of the copy screen image in the X direction (horizontal direction), and yr indicates the ratio of the Y coordinate position of the touch position (x, y) to the size of the copy screen image in the Y direction (vertical direction). The minimum value of each ratio is 0, and the maximum value of each ratio is 1.

Based on xr and yr, the control application program 204 executes the following calculation in order to obtain a position (xx, yy) on the screen of the external display 21, which corresponds to the touch position (x, y) on the copy screen image:

$$xx=Xe0+(Xe1-Xe0)\times xr$$

$$yy=Ye0+(Ye1-Ye0)\times yr.$$

In this manner, the position (xx, yy) on the screen image of the external display 21, which corresponds to the touch position (x, y) on the copy screen image, is calculated based on the relative positions xr and yr of the touch position (x, y) in relation to the copy screen image.

By issuing the pointing event indicative of the coordinates (xx, yy) to the OS 201, etc., the control application program 204 designates the position on the screen image on the external display 21, which corresponds to the touch position on the copy screen image.

Figure 11:
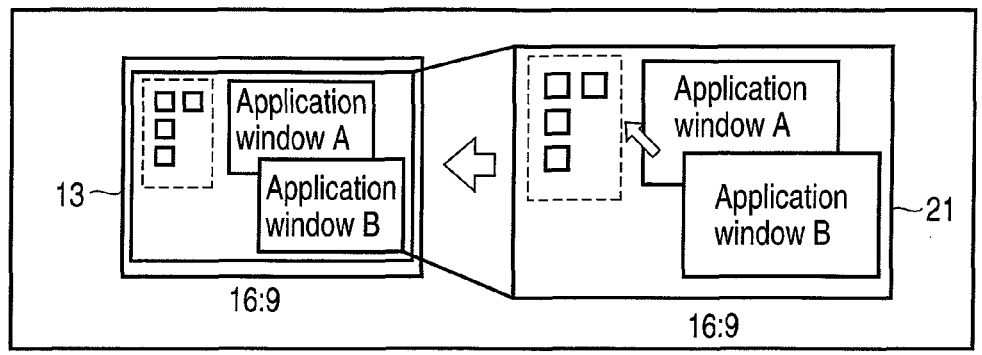
FIG. 11 is an exemplary view illustrating an example of the relationship in screen size and aspect ratio between a screen image of the external display and a copy screen image on the touch screen display.
Figure 12:
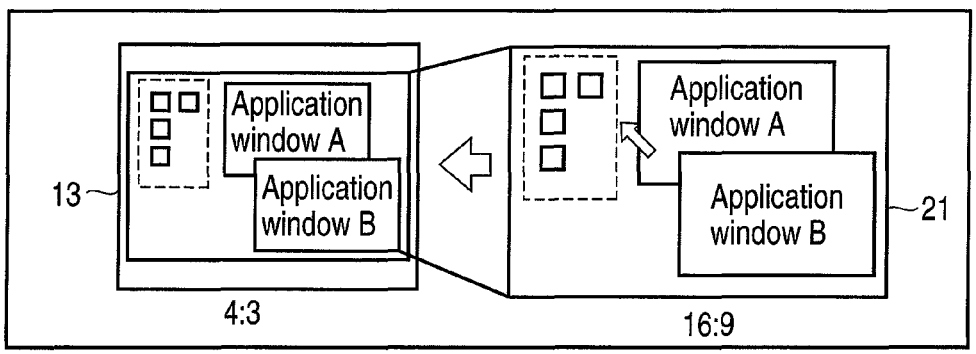
FIG. 12 is an exemplary view illustrating another example of the relationship in screen size and aspect ratio between a screen image of the external display and a copy screen image on the touch screen display.
Figure 13:
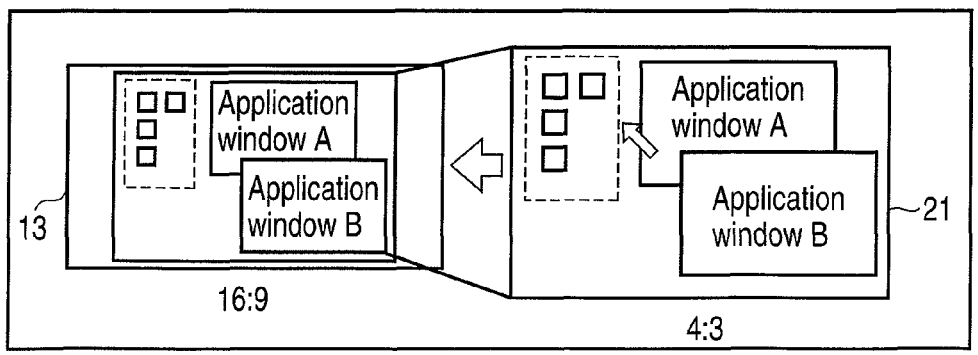
FIG. 13 is an exemplary view illustrating still another example of the relationship in screen size and aspect ratio between a screen image of the external display and a copy screen image on the touch screen display.

Next, referring to FIG. 11 to FIG. 13, a description is given of examples of the relationship in screen size and aspect ratio between the external display 21 and the LCD 13. In the embodiment, as described above, the copy screen image is displayed on the LCD 13 with the same aspect ratio as the screen image displayed on the external display 21. In FIG. 11, the case is assumed in which the aspect ratio of the screen of the external display 21 and the aspect ratio of the screen of the LCD 13 are 16:9, respectively. In this case, as shown in FIG. 11, the copy screen image can be displayed on the entire screen of the LCD 13.

In FIG. 12, the case is assumed in which the aspect ratio of the screen of the external display 21 is 16:9, and the aspect ratio of the screen of the LCD 13 is 4:3. In this case, for example, as shown in FIG. 12, the copy screen image with the aspect ratio of 16:9 is displayed on the screen of the LCD 13 in a display format called "letter box". In FIG. 13, the case is assumed in which the aspect ratio of the screen of the external display 21 is 4:3, and the aspect ratio of the screen of the LCD 13 is 16:9. In this case, for example, as shown in FIG. 13, the copy screen image with the aspect ratio of 4:3 is displayed on the screen of the LCD 13 in such a display format that both side areas are displayed as black strips.

FIG. 14 illustrates an example in which not the entirety of the screen image of the external display 21, but a part of this screen image is displayed, in enlarged scale, on the screen of the LCD 13. For example, the user can designate, as a copy region, an arbitrary part of the screen image of the external display 21. The control application program 204 extracts only an image belonging to the copy region, from the copy of the screen image of the external display 21, and displays the extracted image on the screen of the LCD 13 as the above-described copy screen image. Thereby, even in the case where the resolution of the screen of the LCD 13 is low, the user can point a desired GUI part on the screen image of the external display 21 by a touch operation on the screen of the LCD 13.

FIG. 15 illustrates a state in which a virtual keyboard 101 is displayed on the copy screen image of the LCD 13. By displaying the virtual keyboard 101 on the copy screen image of the LCD 13 in this manner, it becomes possible to input key data by a touch operation, without causing such a problem that a part of the screen image of the external display 21 is hidden by the virtual keyboard 101.

Figure 16:
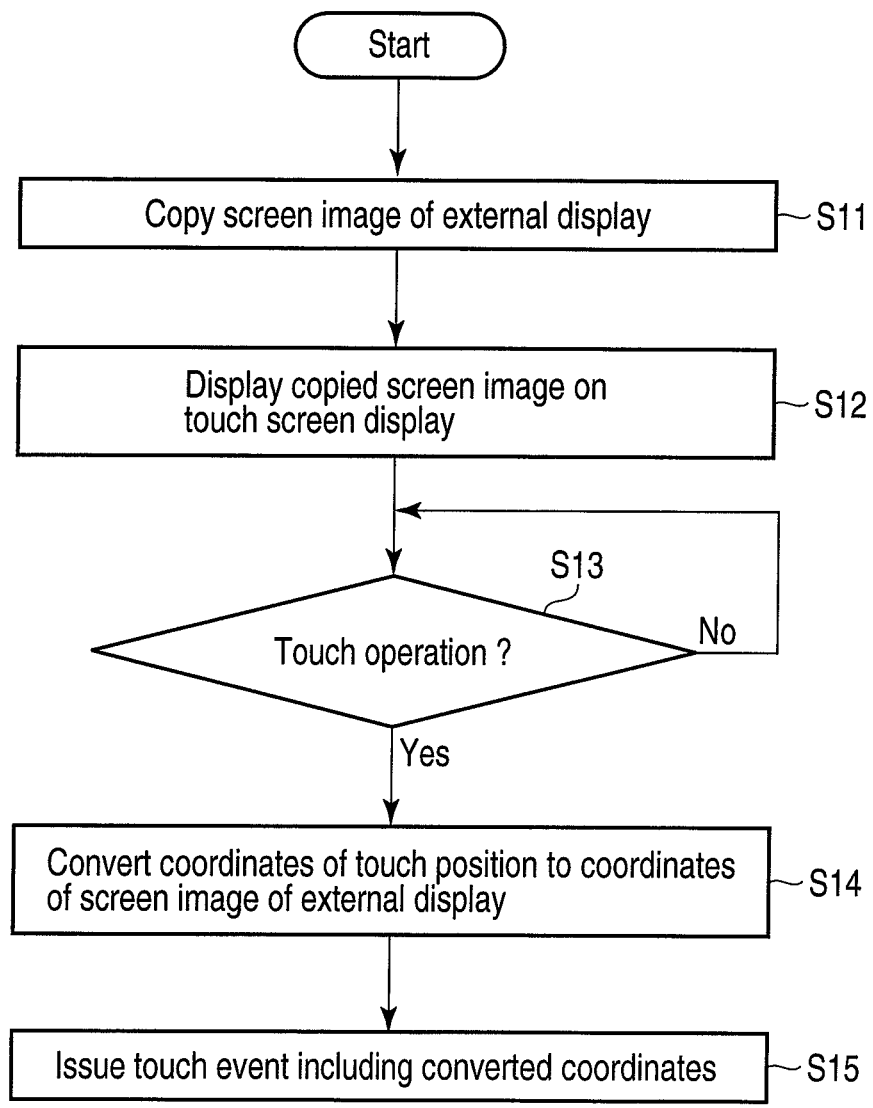
FIG. 16 is an exemplary flow chart illustrating an example of the procedure of an external display control process which is executed by the information processing apparatus of the embodiment.

Next, referring to a flow chart of FIG. 16, a description is given of the procedure of the external display control process which is executed by the control application program 204.

To start with, the control application program 204 copies a screen image which is displayed on the screen of the external display 21 (step S11). The control application program 204 subjects the copied screen image to processing, such as resizing, where necessary, and displays the screen image, which is obtained by the processing, on the touch screen display (LCD 13) as a copy screen image (step S12). The process in step S11 and step S12 is executed periodically, for example, at regular intervals. Thereby, after the time point when the control application program 204 is started, a screen image similar to the screen image of the external display 21 can always be displayed on the touch screen display (LCD 13), and the display screen on the touch screen display (LCD 13) can be used as an operational screen for controlling an application window which is displayed on the external display 21.

Subsequently, the control application program 204 determines whether a position on the copy screen image is touched or not (step S13). If the position on the copy screen image is touched (YES in step S13), the control application program 204 executes a pointing process for designating a position on the screen image of the external display 21, which corresponds to the touch position on the copy screen image, based on the relative position of the touch position in relation to the copy screen image (step S13, S14). For example, in step S13, the control application program 204 converts the coordinates of the touch position to the coordinates on the screen image of the external display 21. In this case, the control application program 204 calculates the relative positions xr and yr of the touch position in relation to the copy screen image, based on the coordinates of the touch position, and calculates the coordinates (xx, yy) indicative of the corresponding position on the screen image of the external display 21, based on the relative positions xr and yr. Then, the control application program 204 issues a pointing event indicative of the coordinates (xx, yy) to the OS 201, etc., thereby designating the position on the screen image on the external display 21, which corresponds to the touch position on the copy screen image (step S14).

As has been described above, according to the present embodiment, the resolution of the external display can effectively be used, and the position on the screen of the external display can easily be designated by using the touch panel display.

Besides, the external display control function of the embodiment is realized by a computer program. Thus, the same advantageous effects as with the present embodiment can easily be obtained simply by installing the computer program into a computer including a touch screen display through a computer-readable storage medium which stores the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a touch screen display having a first resolution;
a connector to which an external display is connected;
a display controller configured to display on the touch screen display a first screen image corresponding to a first region of a virtual screen, and to display on the external display a second screen image corresponding to a second region of the virtual screen different from the first region, wherein the external display has a second resolution greater than the first resolution, a size of the first region is set to be equal to the first resolution, a size of the second region is set to be equal to the second resolution, and the second screen image is different from the first screen image;
a copy screen image display controller configured to copy display data which is stored in a first frame buffer for the external display and corresponds to the second screen image, to generate a copy screen image by reducing the copied display data, and to display the copy screen image on a window of a first application program which is opened on the first screen image by storing display data corresponding to the copy screen image in a second frame buffer for the touch screen display; and
a pointing controller configured to perform a process of pointing a first position on the second screen image of the external display in accordance with a touch position on the copy screen image displayed on the window, wherein the first position on the second screen image is determined based on a relative position of the touch position in relation to the copy screen image displayed on the window,
wherein the copy screen image display controller is configured to execute repeatedly the generation of the copy screen image and the display of the copy screen image.

2. The information processing apparatus of claim 1, wherein the copy screen image display controller is configured to display a screen image corresponding to a part of the second screen image of the external display on the window of the first application program which is opened on the first screen image of the touch screen display, if the part of the second screen image of the external display is designated by a user as a copy region.

3. The information processing apparatus of claim 1, further comprising:
a virtual keyboard display module configured to display a virtual keyboard on the screen of the touch screen display, the virtual keyboard comprising a plurality of virtual keys for inputting key codes; and
a code data generating module configured to select a virtual key from the plurality of virtual keys, which corresponds to a touch position on the screen of the touch screen display, and to generate code data corresponding to the selected virtual key.

4. A pointing method for designating a position on a screen image which is displayed on a screen of an external display connected to a connector of an information processing apparatus, in accordance with a touch position on a touch screen display of the information processing apparatus, the touch screen display having a first resolution, the method comprising:

displaying on the touch screen display a first screen image corresponding to a first region of a virtual screen and displaying on the external display a second screen image corresponding to a second region of the virtual screen different from the first region, wherein the external display has a second resolution greater than the first resolution, a size of the first region is set to be equal to the first resolution, a size of the second region is set to be equal to the second resolution, and the second screen image is different from the first screen image;

copying display data which is stored in a first frame buffer for the external display and corresponds to the second screen image;

generating a copy screen image obtained by reducing the copied display data;

displaying the copy screen image on a window of a first application program which is opened on the first screen image of the touch screen display by storing display data corresponding to the copy screen image in a second frame buffer for the touch screen display; and performing a process of pointing a first position on the second screen image of the external display in accordance with a touch position on the copy screen image displayed on the window, wherein the first position on the second screen image is determined based on a relative position of the touch position in relation to the copy screen image displayed on the window, wherein the generating of the copy screen image and the displaying the copy screen image are repeatedly executed.

5. The pointing method of claim 4, wherein said displaying the copy screen image comprises displaying a screen image corresponding to a part of the second screen image of the external display on the window of the first application program which is opened on the first screen image of the touch screen display, if the part of the second screen image of the external display is designated by a user as a copy region.

6. The information processing apparatus of claim 1, wherein the pointing controller is configured to convert a coordinate of the touch position to a coordinate of the first position, based on the relative position of the touch position in relation to the copy screen image.

7. The pointing method of claim 4, wherein the performing comprises converting a coordinate of the touch position to a coordinate of the first position, based on the relative position of the touch position in relation to the copy screen image.

* * * * *